(12) United States Patent
Brandon, II et al.

(10) Patent No.: US 10,433,396 B1
(45) Date of Patent: Oct. 1, 2019

(54) PORTABLE ELECTRICAL DEVICE WITH INTEGRATED CHARGER

(71) Applicant: Energizer Brands, LLC, St. Louis, MO (US)

(72) Inventors: Michael J. Brandon, II, St. Louis, MO (US); Stephen E. Osmialowski, St. Louis, MO (US); Liu Jing, St. Louis, MO (US)

(73) Assignee: Energizer Brands, LLC, St. Louis, MO (US)

( * ) Notice: Subject to any disclaimer, the term of this patent is extended or adjusted under 35 U.S.C. 154(b) by 0 days.

(21) Appl. No.: 15/943,411

(22) Filed: Apr. 2, 2018

(51) Int. Cl.
*H05B 37/02* (2006.01)
*H02J 7/00* (2006.01)

(52) U.S. Cl.
CPC ............ *H05B 37/02* (2013.01); *H02J 7/0054* (2013.01)

(58) Field of Classification Search
CPC ............... H05B 37/02; H05B 37/0227; H05B 37/0272; H05B 33/08; H05B 33/0842; H05B 33/0845; H02J 7/0054
USPC ........ 315/151–158, 185 R, 209 R, 291, 294, 315/307, 308, 312
See application file for complete search history.

(56) References Cited

U.S. PATENT DOCUMENTS

| | | | |
|---|---|---|---|
| 8,633,824 B2 * | 1/2014 | Miwa | H02J 7/0047 340/635 |
| 8,833,961 B2 | 9/2014 | Chen | |
| 8,853,951 B2 | 10/2014 | Garcia | |
| 9,397,513 B2 * | 7/2016 | Butler | H02J 7/0054 |
| 9,759,421 B1 | 9/2017 | Baschnagel | |
| 2006/0043930 A1 | 3/2006 | Koyanagi et al. | |
| 2008/0231226 A1 | 9/2008 | Hoffman et al. | |
| 2012/0155069 A1 | 6/2012 | Chen | |
| 2015/0009657 A1 | 1/2015 | Bah | |
| 2017/0082250 A1 | 3/2017 | Heilbrun | |
| 2017/0264118 A1 | 9/2017 | Miller et al. | |
| 2018/0013986 A1 | 1/2018 | Chien | |

FOREIGN PATENT DOCUMENTS

| | | |
|---|---|---|
| CN | 201219205 Y | 4/2009 |
| CN | 201739787 U | 2/2011 |
| CN | 201739788 U | 2/2011 |
| CN | 203942676 U | 11/2014 |

(Continued)

OTHER PUBLICATIONS

International Searching Authority, International Search Report and Written Opinion, dated May 14, 2019, (17 pages), European Patent Office, The Netherlands.

*Primary Examiner* — Jimmy T Vu
(74) *Attorney, Agent, or Firm* — Alston & Bird LLP

(57) ABSTRACT

A portable electrical device, such as an electrical lighting device, comprises a charging channel configured for directing electrical power from the electrical device to a separate electrical device connected via the charging channel (e.g., a charging port). While the charging port is unused, the electrical device generates outputs (e.g., lighting outputs) at a first output power level (e.g., a first brightness). The electrical device also comprises an onboard controller configured to monitor the charging channel, and upon detecting an electrical device connected via the charging channel, the onboard controller decreases the output power to a second output power level (e.g., a second brightness) to conserve power.

18 Claims, 3 Drawing Sheets

(56) References Cited

FOREIGN PATENT DOCUMENTS

| | | |
|---|---|---|
| CN | 205859704 U | 1/2017 |
| CN | 107726112 A | 2/2018 |
| EP | 2648308 A1 | 10/2013 |

* cited by examiner

PORTABLE ELECTRICAL DEVICE WITH INTEGRATED CHARGER

BACKGROUND

As portable electronic devices are becoming increasingly more prevalent, consumers are constantly looking for new sources of electrical power that may be utilized to recharge those portable electronic devices. For example, the onboard power source (e.g., batteries) of other portable electrical devices, such as flashlights, lanterns, radios, speakers (e.g., Bluetooth® connected speakers), and/or the like, may be utilized to charge a rechargeable power source of a separate, connected electronic device (e.g., a mobile phone) by connecting the separate electronic device to a charging channel (e.g., a charging port) of the electrical device. Incorporating charging ports into certain electrical devices may be particularly beneficial for consumers who often utilize the electrical devices where no other power sources (e.g., wall outlets) are available. For example, campers, hikers, and other outdoorsmen may often utilize various devices (e.g., a mobile phone and/or a camping lantern) far away from power grid based power sources, and therefore those users may seek auxiliary power supplies that may be utilized to recharge certain electronic devices. However, the onboard power supplies of these electrical devices have a finite power capacity capable of outputting only a finite amount of power in the form of electrical current, and therefore users of these devices must decide how to use these auxiliary power supplies: for their primary purpose (e.g., as a flashlight, speaker, and/or the like) or as a power supply to recharge other, connected devices.

Thus, a need exists for electrical device features that enable users to recharge other devices without significantly diminishing the functionality of the electrical devices for other purposes.

BRIEF SUMMARY

Various embodiments are directed to a portable electrical device (e.g., a flashlight, a lantern, and/or the like) having an integrated device charging channel port that may be used for charging separate electrical devices (e.g., mobile phones, handheld computing devices, and/or the like). The electrical device may have an onboard power supply (e.g., one or more batteries) configured to provide power to output devices (e.g., integrating lighting devices) and the integrated device charging channel port. The electrical device may have an onboard controller configured to monitor power usage of the electrical device, and to automatically throttle and/or redirect a flow of power from the onboard power supply to one of the output devices and/or the integrated device charging channel port. For example, upon detecting an external device connected via the integrated device charging channel port, the controller may decrease the amount of power provided to the output devices (e.g., the lighting device) to conserve electrical energy to be utilized for charging the connected device.

Certain embodiments are directed to a portable electrical device comprising: a power supply; an output device configured for generating an output power between a minimum output power and a maximum output power; a charging channel configured for transmitting electrical current from the power supply to a separate electrical device; and an onboard controller configured to, upon detecting a separate electrical device connected via the charging channel, decrease the maximum output power of the output device.

In certain embodiments, the output device of the portable electrical device is a lighting device configured for generating a light output having a brightness between a minimum brightness and a maximum brightness, and wherein the onboard controller is configured to decrease the maximum output brightness upon detecting the presence of a separate electronic device connected via the charging channel. Moreover, the charging channel may comprise a charging port configured to accept a charging cable electrically connected with the separate electronic device.

In certain embodiments, the output device is configured to generate an output at a first output power; and the onboard controller is configured to: detect a separate electrical device connected via the charging channel; and adjust the output power of the output generated by the output device to a second output power less than the first output power. Moreover, the output device may be configured for generating an output at one of a plurality of discrete output power levels comprising at least a minimum output power level and a maximum output power level. The onboard controller may be configured to deactivate the maximum output power level upon detection of a separate electronic device connected via the charging channel. In various embodiments, decreasing the maximum output power of the output device comprises decreasing the output power of the output from a first discrete output power level to a second discrete output power level.

In certain embodiments, the onboard controller comprises at least two output profiles comprising: a first output profile defining a first minimum output power level and a first maximum output power level, wherein the onboard controller is configured to implement the first output profile while no separate electrical devices are detected to be connected via the charging channel; and a second output profile defining a second minimum output power level and a second maximum output power level, wherein the onboard controller is configured to implement the second output profile upon detecting a separate electrical device connected via the charging channel, and wherein the second maximum output power level is less than the first maximum output power level. Moreover, the power supply may comprise one or more onboard batteries.

Various embodiments are directed to an electrical device controller configured for controlling an output of a portable electrical device. In various embodiments, the electrical device controller configured for: transmitting power from a power supply of the electrical device to an output device of the electrical device to cause the output device to generate an output having a output power between a minimum output power and a maximum output power; monitoring a charging channel of the electrical device to determine whether a separate electrical device is connected to the electrical device via the charging channel; and upon detecting a separate electrical device connected via the charging channel, decreasing the maximum output power level of the output device.

In certain embodiments, the output device is a lighting device configured for generating a light output having a brightness between a minimum brightness and a maximum brightness, and wherein the electrical device controller is configured to decrease the maximum output brightness upon detecting the presence of a separate electronic device connected via the charging channel. Moreover, the electrical device controller may be further configured to: detect an electrical device connected via the charging channel while the output device is generating an output at a first output power; and adjust the power transmitted from the power supply to the output device to decrease the output power of the output to a second output power less than the first output power. In certain embodiments, transmitting the power from the power supply to the output device comprises: throttling the power to one of a plurality of discrete output power levels, wherein the plurality of discrete output power levels comprises at least a minimum output power level and a maximum output power level. Moreover, the electrical device controller may be further configured to deactivate the maximum power level upon detection of a separate electrical device connected via the charging channel. In various embodiments, the electrical device controller is further configured for implementing at least two output profiles in the alternative, wherein the at least two output profiles comprise: a first output profile defining a first minimum output power level and a first maximum output power level, wherein the electrical device controller is configured to implement the first output profile while no separate electrical devices are detected to be connected via the charging channel; and a second output profile defining a second minimum output power level and a second maximum output power level, wherein the electrical device controller is configured to implement the second output profile upon detecting a separate electrical device connected via the charging channel, and wherein the second maximum output power level is less than the first maximum output power level.

Various embodiments are directed to a method for operating an electrical device. The method may comprise: transmitting power from a power supply of the electrical device to an output device of the electrical device to cause the output device to generate an output having a power level between a minimum output power level and a maximum output power level; monitoring a charging channel of the electrical device to determine whether a separate electrical device is connected to the electrical device via the charging channel; and upon detecting a separate electrical device connected via the charging channel, decreasing the maximum output power level of the output device.

In various embodiments, the output device is a lighting device configured for generating a light output having a brightness between a minimum brightness and a maximum brightness, and the method further comprises steps for decreasing the maximum output brightness upon detecting the presence of a separate electrical device connected via the charging channel. Moreover, the method may further comprise: detecting an electrical device connected via the charging channel while the output device is generating an output at a first output power level; and adjusting the power transmitted from the power supply to the output device to decrease the power level of the output to a second output power level less than the first output power level.

In certain embodiments, transmitting the power from the power supply to the output device comprises throttling the power to one of a plurality of discrete output power levels, wherein the plurality of discrete output power levels comprises at least a minimum output power level and a maximum output power level. Moreover, the method may further comprise: transmitting the power from the power supply to the output device according to a first output profile while no separate electrical devices are detected to be connected via the charging channel, wherein the first output profile defines a first minimum output power level and a first maximum output power level; and upon detecting a separate electrical device is connected via the charging channel, transmitting the power from the power supply to the output device according to a second output profile, wherein the second output profile defines a second minimum output power level and a second maximum output power level and wherein the second maximum output power level is less than the first maximum output power level.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1:
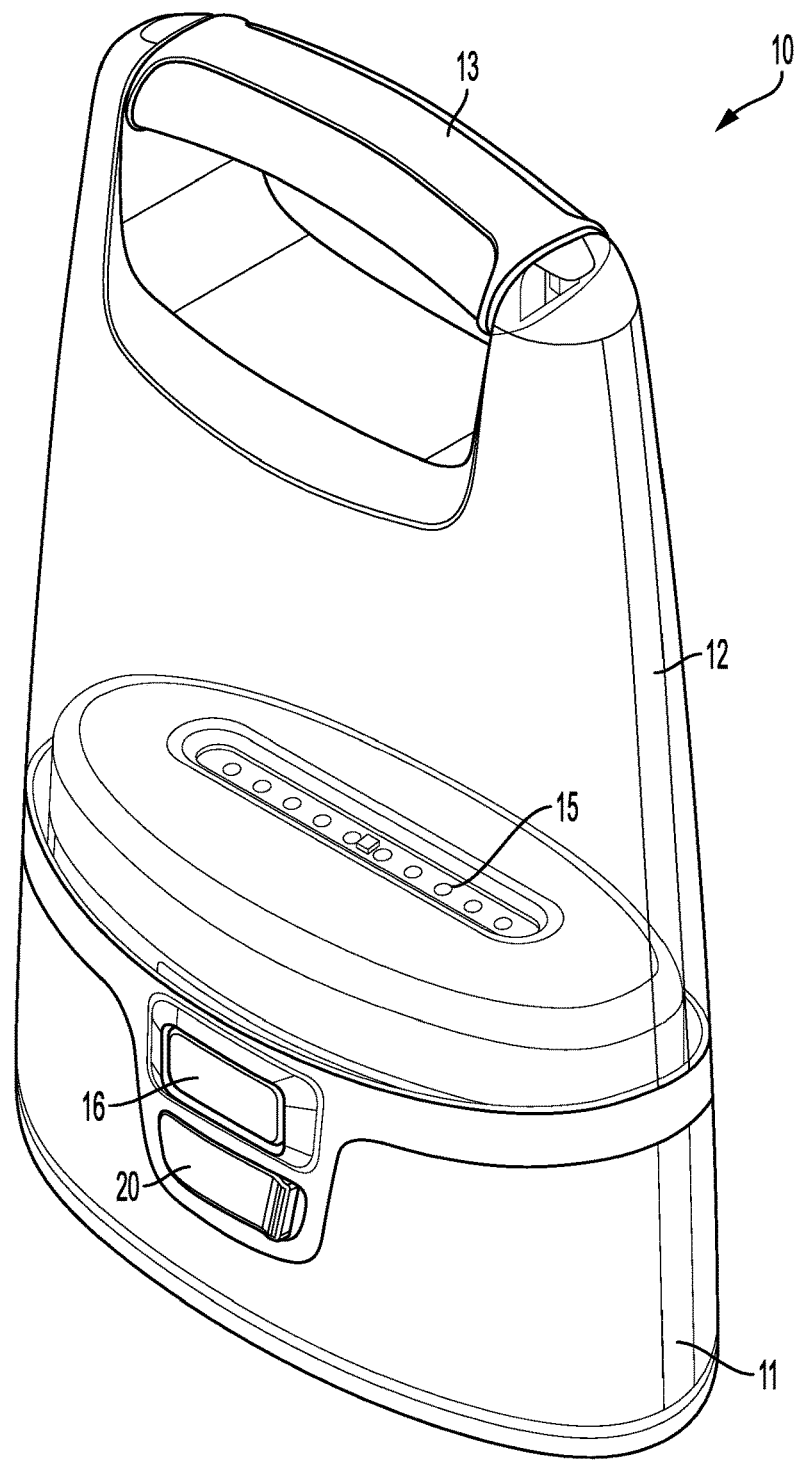
FIG. 1 shows an example electrical device embodied as a lighting device according to one embodiment.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Embodiments as described herein may incorporate power supplies incorporated within electrical devices (e.g., lighting devices) that may be utilized as auxiliary power supplies for transmitting electrical current to one or more separate electrical devices (e.g., cell phones, tablets, portable computers, flashlights, fans, speakers, cables, and/or the like). In certain embodiments, electrical devices may be connected relative to one another to transmit electrical current to and through one electrical device to another electrical device (e.g., a cell phone may be connected with an electrical cable that may be connected to the portable electrical device utilized as an auxiliary power supply). Thus, users are provided with the functionality of an auxiliary power supply that may be utilized to charge (and/or recharge) electrical devices having corresponding onboard power supplies without requiring the user to carry additional devices beyond those that would otherwise be used during excursions away from the power grid.

As discussed herein, the charging channels (e.g., charging ports) are incorporated into portable electrical devices having other functions beyond providing an auxiliary power source. For example, the portable electrical devices may comprise one or more output devices configured to generate one or more outputs (e.g., light signals, sound signals, radio signals, and/or the like), such as light emitted from a lighting device, sound emitted from a speaker, and/or the like. In order to conserve power of the portable electrical device and to balance usability of the electrical device as a power supply and for alternative output functions (e.g., generation of outputs, such as light signals), the electrical device may have an onboard controller configured to limit the flow of power (e.g., electrical current) utilized by one or more of the output devices for generating respective outputs while a separate electrical device is detected to be connected via the charging channel. The onboard controller monitors the charging channel, and upon detecting a separate electrical device connected thereto (e.g., via detection of a triggering event of a physical switch and/or an electrical signal switch), decreases the power transmitted to the output device for generating output. For example, an onboard controller within a camping lantern having an integrated charging port may be configured to dim the light emitted by the camping lantern while a separate electrical device (e.g., a charging cable that may be connected relative to a mobile phone) is connected to the integrated charging port. As yet another example, an onboard controller within a speaker having an integrated charging port may be configured to lower the output volume of the speaker while a separate electrical device is connected to the integrated charging port.

Portable Electrical Device

An example portable electrical device 10 is shown in FIG. 1. As shown therein, the portable electrical device 10 may be embodied as a portable electrical lantern configured for emitting a light output, and having various electrical components positioned within a housing 11. However, it should be understood that the portable electrical device 10 may be embodied as a flashlight, a speaker, a radio, a display device, a fan, a heater, a humidifier, a dehumidifier, or any of a variety of electrical devices that may include a power supply (e.g., an onboard power supply).

With reference again to the embodiment of FIG. 1, the housing 11 encompasses a lens portion 12 and an integrated handle 13. The lens portion 12 may be transparent or translucent to enable light generated by a light source 15 located within the lens portion 12 to be emitted through the lens portion 12 to be discernable by a user. Moreover, the light source 15 may comprise one or more light emitters (e.g., light emitting diodes (LEDs)) that may be configured for simultaneous illumination and/or alternative illumination, thereby providing a plurality of alternative lighting modes. As a specific example, the light source 15 may comprise a red LED configured for providing relatively low levels of red light and one or more white LEDs configured for providing relatively higher levels of white light. In certain embodiments, the portable electrical lantern may be configured to activate the red LED via a first lighting mode (e.g., a red light mode) or the one or more white LEDs (e.g., a plurality of white LEDs) via a second lighting mode (e.g., a white light mode) in the alternative.

As shown in FIG. 1, the portable electrical device 10 comprises a user interface (embodied as a power switch 16 in the illustrated embodiment) configured to accept user input to select from a plurality of usage states for the portable electrical device 10. The user interface may comprise one or more buttons, one or more sliders, one or more switches, one or more interface wheels, one or more capacitive sensors, and/or the like. In various embodiments, the user interface enables a user to select between an "on" state (e.g., a single "on" state at a non-selectable power level) and an "off" state. The user interface may, in certain embodiments, enable selection between a plurality of "on" states corresponding to various output modes (e.g., a red light mode or a white light mode) and/or various output power levels (e.g., various brightness levels emitted by the light source 15 of the illustrated lantern). A single button user interface may allow users to cycle between an "off" state and various "on" states with sequential activations of the button. For example, pressing the button once turns the light on to a first lighting mode (e.g., a red light mode), pressing the button again changes the light to a second lighting mode (e.g., a white light mode) at a first brightness level, and pressing the button a third time changes the light to a second brightness level within the second lighting mode, and pressing the button yet again cycles the light back to the off state. Other example embodiments comprise only a single lighting mode, and therefore pressing the user-interface button multiple times may cycle the light through various brightness levels within a single lighting mode (e.g., within a white light mode).

Moreover, as shown in FIG. 1, the portable electrical device 10 comprises at least one charging channel configured for providing power from the portable electrical device 10 to a separate electrical device 50 (shown schematically in FIG. 2) connected via the charging channel. In the illustrated embodiment of FIG. 1, the charging channel is embodied as a charging port 20 (e.g., a USB-port, a micro-USB port, a mini-USB port, a lightning charger port, and/or the like) configured to accept an electrical device 50 (e.g., a charging/data cable, an electrical device comprising an onboard, rechargeable power supply, and/or the like). However, the charging channel may also be embodied as any of a variety of power-communicating interfaces, such as a wireless inductive charging interface, a magnetic power port, a two-prong power outlet, and/or the like.

Figure 2:
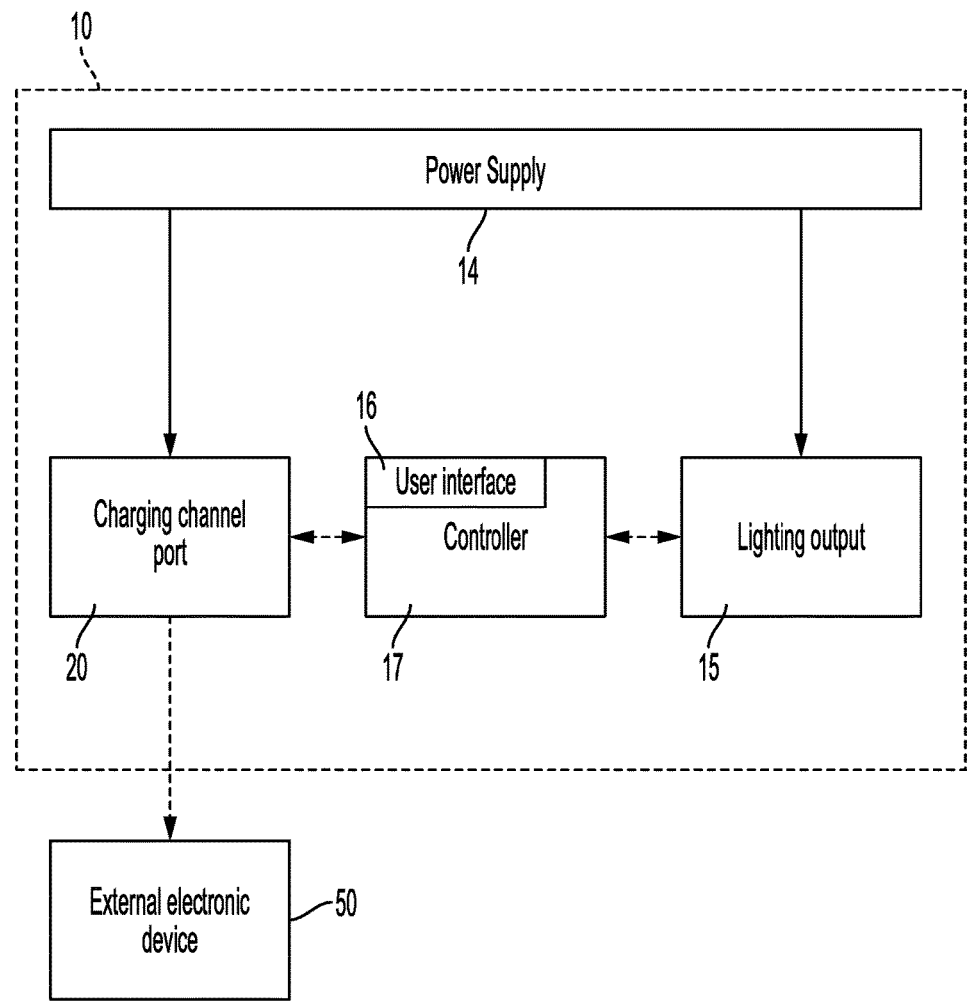
FIG. 2 shows a schematic diagram of various electrical components of an example lighting device according to one embodiment.

As shown schematically in FIG. 2, the portable electrical device 10 comprises a power supply 14, which may be embodied as an onboard power supply comprising one or more batteries (e.g., replaceable primary batteries or rechargeable secondary batteries (integrated within the portable electrical device 10 or replaceable secondary batteries)) or other electricity storage devices. For example, a portable lighting device 10 embodied as a lantern as shown in FIG. 1 may comprise an onboard power supply embodied as 4 D-cell batteries, and the lantern may be capable of generating a light output of at least about 1000 lumens. As yet another example, the power supply 14 may comprise one or more power converters (e.g., connectable to external, continuous power supplies), and/or the like.

The power supply 14 provides power to an output device configured for generating an output (e.g., lighting device 15 configured for generating a light output) and the at least one charging channel (e.g., charging channel port 20) via a controller 17. In certain embodiments, the controller 17 is embodied as an integrated circuit configured for directing a flow of electrical power (e.g., electrical current) from the power supply 14 to the output device and/or the at least one charging channel. The controller 17 is in communication with the user interface 16 to direct power from the power supply 14 to the portable electrical device output in accordance with user provided input to provide an output having an output power level as desired by the user.

The controller 17 also forms a feedback loop with the charging channel to detect when a separate electrical device 50 is connected for charging from the portable electrical device 10. In embodiments in which the charging channel is embodied as a charging channel port 20, the charging channel port 20 may comprise a presence sensor for detecting when a portable electrical device 10 is connected to the charging channel port 20. For example, the charging channel port 20 may comprise a presence-sensing pin that transmits a signal upon detecting a connected separate electrical device 50 to the onboard controller 17 to indicate the presence of the separate electrical device 50 in electrical connection with the charging channel port 20. One particular embodiment of a charging channel port 20 is a 5 pin USB connector. As yet other examples, the charging channel may comprise mechanical switches for detecting the presence of a separate electrical device 50 (e.g., cables connected via the charging channel), magnetic switches, current-sensors for detecting an electrical current drawn across the charging channel to a connected separate electrical device 50, and/or the like.

Figure 3:
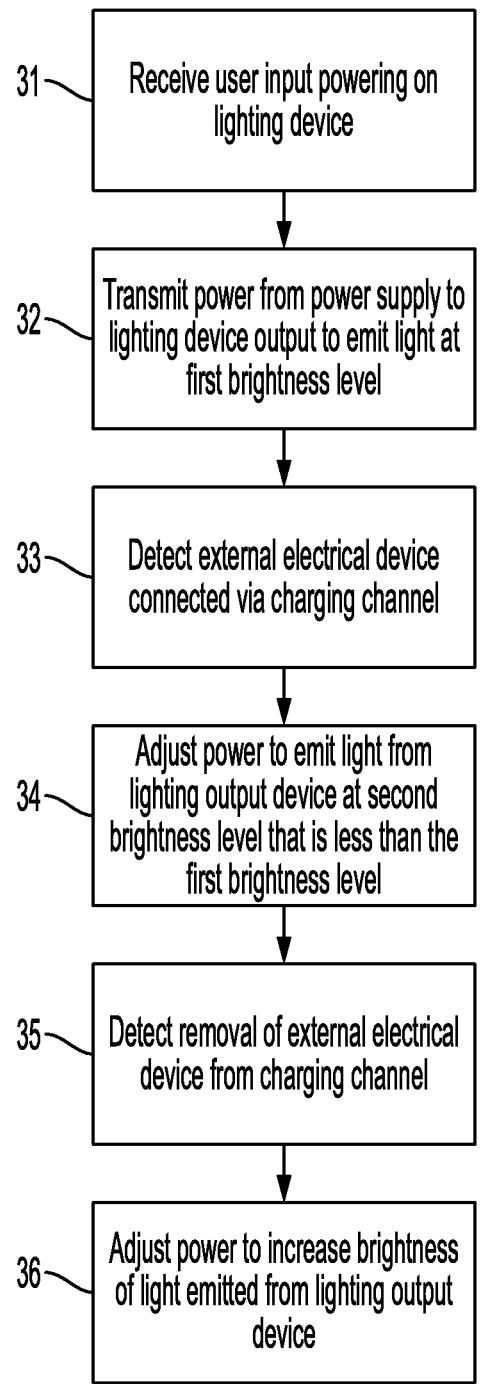
FIG. 3 is a flow chart illustrating the functionality of an example lighting device according to one embodiment.

The onboard controller 17 is configured to control the electrical power expended by the portable electrical device 10 for generating outputs via the output device (e.g., lighting devices 15) and for charging separate electrical devices 50 via the charging channel. In certain embodiments, the onboard controller 17 may be configured to throttle electrical power (e.g., by decreasing a permitted maximum constant current to be provided to the output device, by decreasing the width of power-pulses provided to the output device via pulse-width modulation, and/or the like) supplied to the output device (e.g., lighting devices 15), thereby decreasing the output power level emitted by the output device when a separate electrical device 50 is detected to be connected via the charging channel. For example, the onboard controller 17 may be configured to implement a maximum constant current level to be provided to the output device that is lower than a maximum constant current level implemented while no separate electrical device 50 is connected relative to the charging channel, thereby decreasing the output power level generated by the output device (e.g., dimming the output light emitted by a lighting device 15). As yet another example, the onboard controller 17 may be configured to provide pulse-width modulated current pulses to the output device at shorter power intervals as compared to the length of power intervals provided when no separate electrical device 50 is connected via the charging channel, which thereby decreases the output power level generated by the output device. Specifically, when a separate electrical device 50 is detected to be connected via the charging channel, the onboard controller 17 decreases the power provided to the output device if the output device is active at the time the electrical connection is formed with the separate electrical device 50 via the charging channel, and/or the onboard controller 17 decreases a maximum output power level available for the onboard output device (e.g., lighting devices 15). FIG. 3 provides a flowchart showing an example functionality of a portable electrical device 10 embodied as a lantern according to one embodiment. In certain embodiments, the onboard controller 17 is configured to decrease the power provided to the output device if the output device is active in a particular mode of operation of a plurality of modes of operation. For example, in embodiments in which the portable electrical device 10 is embodied as a lighting device comprising a red LED (e.g., providing a first, red light mode operation when active) and one or more white LEDs (e.g., providing a second, white light mode of operation when active), the onboard controller 17 may be configured to dim the output when the portable electrical device 10 is active in the second, white light mode of operation. The first, red light mode of operation may itself provide a sufficiently low current draw (e.g., less than the second, white light mode of operation after dimming) that dimming of the red LED does not provide an impact on the amount of power available for the at least one charging channel.

As shown in FIG. 3, the portable electrical device 10 receives a user input powering on the lighting device as shown at Block 31. The user input may select a desired mode of operation and/or a desired power/brightness/output power level between a minimum and a maximum power/brightness/output power level (e.g., selecting one of a plurality of discrete output power level options, selecting an output power level within an infinitely adjustable range of available output power level between a minimum output power level and a maximum output power level, or selecting a single available "on" power level), and the controller 17 directs electrical current from the power supply 14 to the lighting devices 15 to emit light at a first brightness level (a first lighting output power level) in accordance with the selected power level, as identified at Block 32. The controller 17 also monitors the charging channel to detect if/when a separate electrical device 50 is connected for charging. Upon detecting the formation of a connection (e.g., a physical connection, an electrical connection, and/or the like) with a separate electrical device 50 via the charging channel while the lighting device is active (as indicated at Block 33), the controller adjusts the flow of power transmitted to the lighting device 15 to decrease the emitted brightness level to a second brightness level (a second lighting output power level) as indicated at Block 34. The adjustment to the brightness level may be made without user interaction with the user interface 16. As mentioned, such adjustments in power output may be made while the lighting device is active in one of a plurality of modes of operation, while the lighting output level may remain at least substantially constant (e.g., without adjustment) while the lighting device is active in a second one of the plurality of modes of operation.

The controller 17 may continue monitoring the at least one charging channel and, upon detecting the removal of the separate electrical device 50 (e.g., disconnection of the separate electrical device 50 from the charging channel) while the lighting device 15 is active (as indicated at Block 35) the controller 17 may increase the power provided to the lighting device 15 to increase the brightness level (e.g., to the first brightness/lighting output power level, to a third brightness/lighting output power level between the first brightness/lighting output power level and the second brightness/lighting power output level), as indicated at Block 36. As just one example, the controller 17 may increase the power provided to the lighting device 15 to increase the brightness level to a third brightness level that is greater than the dimmed brightness level provided while an external electrical device is connected, but is less than (dimmer) than the first brightness level emitted prior to connecting the external electrical device. As a specific example, the controller 17 may increase the power provided to the lighting device 15 to increase the brightness level to a "low" user selectable brightness level. The controller 17 may provide the user with the option to return to a brighter, "high" user selectable brightness level via the user interface.

As an example, the controller 17 may decrease the brightness of the lighting devices 15 by an amount greater than 50%, for example an amount between about 90%-99% relative to the first brightness level emitted while no separate electrical device 50 is connected relative to the charging channel (such that the brightness emitted after dimming is between about 1%-10% of the brightness emitted prior to dimming). Decreasing the brightness emitted by the lighting devices 15 conserves power from the power supply for use in charging the connected separate electrical device 50, while simultaneously prolonging the amount of time the lighting device is capable of emitting light based on the electrical power stored in the power supply 14.

In certain embodiments, the controller 17 may decrease the maximum available brightness level (e.g., the maximum output power level) that may be emitted by the lighting devices 15 upon detection of a separate electrical device 50 connected to the charging channel. The controller 17 may implement this brightness maximum regardless of whether the lighting devices 15 are powered on at the time when the connection with the separate electrical device 50 is formed. However, upon later activation of the lighting devices 15 (e.g., in response to user input provided to the user interface) while the separate electrical device 50 remains connected via the charging channel, the controller 17 limits the amount of power provided to the lighting devices 15 in accordance with the implemented maximum, thereby limiting the maximum brightness level that may be emitted by the lighting devices 15 while the separate electrical device 50 remains connected relative to the charging channel.

As mentioned, the portable electrical device 10 may enable a user to select a desired brightness level upon activation of the lighting device 15. In such embodiments, the controller 17 may be configured to adjust the maximum brightness level available to the user via the user interface 16 while enabling the user to select a brightness level between a minimum brightness level (e.g., an "off" state) and the maximum brightness level established by the controller 17 upon detecting the presence of an separate electrical device 50 connected via the charging channel. In certain embodiments, the controller 17 may deactivate any brightness levels above the maximum brightness level, while leaving other brightness level options unchanged. For example, in embodiments in which the portable electrical device 10 enables users to select between a plurality of discrete brightness levels, those brightness levels being above the maximum brightness level may be disabled by the controller 17. In other embodiments, the controller 17 may adjust the brightness level emitted at various brightness level options made available to the user. For example, the controller 17 may proportionally adjust the brightness level emitted at each brightness level option available to a user (e.g., each brightness level may be decreased by a percentage). As yet another example, the controller 17 may limit the emitted brightness to a maximum brightness level that is less than any of the user-selectable brightness levels while an electrical device is connected.

By decreasing the power level provided to an output device of a portable electrical device 10 while a separate electrical device 50 is connected via a charging channel, the portable electrical device 10 allocates a larger percentage of available electrical power (e.g., stored via onboard power supply 14) toward charging the connected separate electrical device 50 while simultaneously increasing the amount of time the output device of the portable electrical device 10 is operational based on the power provided by the onboard power supply 14.

As an example, for a power supply 14 comprising 4 D-size batteries, the controller 17 may be configured to direct between about 0.7 A-5 A of current to the charging channel while an electrical device 50 is connected thereto, and between about 25-35 mA of current to the output device 15. The total amount of current available, and therefore the total amount of current directed to the charging channel may be dependent on the type of batteries provided within the power supply 14. For example, for alkaline D-size batteries, the amount of current directed to the charging channel may be between about 0.5-2 A (e.g., between about 700-900 mA).

Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

As discussed above, the portable electrical device 10 may be embodied as a lighting device, a speaker, a display device, or any of a variety of portable electrical devices having an integrated charging channel. The concepts discussed herein may be implemented with any of a variety of portable electrical devices 10 by including an onboard controller 17 as discussed herein and configured for limiting an output power provided to the output device of the portable electrical device 10 (thereby limiting the output power level generated by the output device) while a separate electrical device 50 is in electrical connection with the charging channel. As other, non-limiting examples, the maximum volume of a speaker may be decreased while a separate electrical device 50 is connected with the charging channel of the speaker, a maximum rotational speed of a fan may be decreased while a separate electrical device 50 is connected with the charging channel of the fan, a maximum display brightness may be decreased while a separate electrical device 50 is connected with the charging channel of a display device, and/or the like.

Moreover, in embodiments comprising a plurality of charging channels (e.g., a plurality of charging ports 20), the onboard controller 17 may monitor each of the plurality of charging channels, and may adjust the output device (e.g., lighting device) output based on the number of electrical devices 50 connected. For example, the onboard controller 17 may be configured to adjust the brightness to a first dimmed brightness level while only one electrical device 50 is connected, and may adjust the brightness to a second dimmed brightness level while two electrical devices 50 are connected. Similarly, the onboard controller 17 may be configured to monitor the current draw from each of the connected electrical devices 50, and may adjust the dimmed brightness level based on the amount of current draw across the at least one charging channel. For example, the amount by which the lighting device is dimmed may increase (e.g., proportionally or stepwise between discrete dimmed brightness levels) as the current draw across the charging channel increases.

That which is claimed:

1. A portable electrical device comprising:
   a power supply;
   an output device configured for generating an output having an output power between a minimum output power level and a maximum output power level;
   a charging channel configured for transmitting electrical current from the power supply to a separate electrical device; and
   an onboard controller configured to, upon detecting a separate electrical device connected via the charging channel, decrease the maximum output power level of the output device; and
   wherein:
   the output device is configured to generate an output having an output power at a first output power level; and
   the onboard controller is further configured to:
   detect the separate electrical device connected via the charging channel while the output device is generating an output having an output power at the first output power level; and
   adjust the output power to a second output power level less than the first output power level.

2. The portable electrical device of claim 1, wherein the output device is a lighting device configured for generating a light output having a brightness between a minimum brightness and a maximum brightness, and wherein the onboard controller is configured to decrease the maximum brightness upon detecting the presence of a separate electrical device connected via the charging channel.

3. The portable electrical device of claim 1, wherein the charging channel comprises a charging port configured to accept a charging cable electrically connected with the separate electrical device.

4. The portable electrical device of claim 1, wherein the output device is configured for generating an output having an output power at one of a plurality of discrete output power levels comprising at least a minimum output power level and a maximum output power level.

5. The portable electrical device of claim 4, wherein the onboard controller is configured to deactivate the maximum output power level upon detection of a separate electrical device connected via the charging channel.

6. The portable electrical device of claim 4, where decreasing the maximum output power level of the output device comprises decreasing the output power of the output from a first discrete output power level to a second discrete output power level.

7. The portable electrical device of claim 1, wherein the onboard controller comprises at least two output profiles comprising:
   a first output profile defining a first minimum output power level and a first maximum output power level, wherein the onboard controller is configured to implement the first output profile while no separate electrical devices are detected to be connected via the charging channel; and
   a second output profile defining a second minimum output power level and a second maximum output power level, wherein the onboard controller is configured to implement the second output profile upon detecting a separate electrical device connected via the charging channel, and wherein the second maximum output power level is less than the first maximum output power level.

8. The portable electrical device of claim 1, wherein the power supply comprises one or more onboard batteries.

9. An electrical device controller configured for controlling an output of a portable electrical device, the electrical device controller configured for:
   transmitting power from a power supply of the portable electrical device to an output device of the portable electrical device to cause the output device to generate an output having an output power between a minimum output power level and a maximum output power level;
   monitoring a charging channel of the portable electrical device to determine whether a separate electrical device is connected to the portable electrical device via the charging channel;
   upon detecting a separate electrical device connected via the charging channel while the output device is generating an output having an output power at a first output power level, decreasing the maximum output power level of the output device; and
   adjusting the power transmitted from the power supply to the output device to decrease the output power of the output to a second output power level less than the first output power level.

10. The electrical device controller of claim 9, wherein the output device is a lighting device configured for generating a light output having a brightness between a minimum brightness and a maximum brightness, and wherein the electrical device controller is configured to decrease the maximum brightness upon detecting the presence of a separate electrical device connected via the charging channel.

11. The electrical device controller of claim 9, wherein transmitting the power from the power supply to the output device comprises:
   throttling the power to one of a plurality of discrete power levels, wherein the plurality of discrete power levels comprises at least a minimum power level and a maximum power level.

12. The electrical device controller of claim 11 is further configured to deactivate the maximum power level upon detection of a separate electrical device connected via the charging channel.

13. The electrical device controller of claim 9 is further configured for implementing at least two output profiles in the alternative, wherein the at least two output profiles comprise:
   a first output profile defining a first minimum output power level and a first maximum output power level, wherein the electrical device controller is configured to implement the first output profile while no separate electrical devices are detected to be connected via the charging channel; and
   a second output profile defining a second minimum output power level and a second maximum output power level, wherein the electrical device controller is configured to implement the second output profile upon detecting a separate electrical device connected via the charging channel, and wherein the second maximum output power level is less than the first maximum output power level.

14. A method for operating an electrical device, the method comprising:
   transmitting power from a power supply of the electrical device to an output device of the electrical device to cause the output device to generate an output having an output power between a minimum output power level and a maximum output power level;
   monitoring a charging channel of the electrical device to determine whether a separate electrical device is connected to the electrical device via the charging channel; and
   upon detecting a separate electrical device connected via the charging channel while the output device is generating an output having an output power at a first output power level, decreasing the maximum output power level of the output device; and
   adjusting the power transmitted from the power supply to the output device to decrease the output power of the output to a second output power level less than the first output power level.

15. The method for operating an electrical device of claim 14, wherein the output device is a lighting device configured for generating a light output having a brightness between a minimum brightness and a maximum brightness, and wherein the method further comprises decreasing the maximum brightness upon detecting the presence of a separate electrical device connected via the charging channel.

16. The method for operating an electrical device of claim 14, wherein transmitting the power from the power supply to the output device comprises throttling the power to one of a plurality of discrete power levels, wherein the plurality of discrete power levels comprises at least a minimum power level and a maximum power level.

17. The method for operating an electrical device of claim 14, further comprising:

transmitting the power from the power supply to the output device according to a first output profile while no separate electrical devices are detected to be connected via the charging channel, wherein the first output profile defines a first minimum output power level and a first maximum output power level; and upon detecting a separate electrical device is connected via the charging channel, transmitting the power from the power supply to the output device according to a second output profile, wherein the second output profile defines a second minimum output power level and a second maximum output power level and wherein the second maximum output power level is less than the first maximum output power level.

18. A portable electrical device comprising:
a power supply;
an output device configured for generating an output having an output power between a minimum output power level and a maximum output power level;
a charging channel comprising a charging port configured to accept a charging cable electrically connected with a separate electrical device and configured for transmitting electrical current from the power supply to the separate electrical device; and an onboard controller configured to, upon detecting a separate electrical device connected via the charging channel, decrease the maximum output power level of the output device.

* * * * *